United States Patent
Rao

(10) Patent No.: US 7,720,104 B2
(45) Date of Patent: May 18, 2010

(54) METHOD TO IMPROVE SENSITIVITY OF DECODING TIME OF A GLOBAL POSITIONING SYSTEM RECEIVER AT LOW SIGNAL TO NOISE RATIO

(75) Inventor: Sandeep Rao, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 46 days.

(21) Appl. No.: 12/168,901

(22) Filed: Jul. 8, 2008

(65) Prior Publication Data

US 2010/0008382 A1  Jan. 14, 2010

(51) Int. Cl.
*H04J 3/00* (2006.01)
(52) U.S. Cl. ................... 370/498; 370/464; 342/387; 342/357.1
(58) Field of Classification Search ................ 370/498, 370/464; 342/387, 357.1
See application file for complete search history.

(56) References Cited

U.S. PATENT DOCUMENTS

| | | | | |
|---|---|---|---|---|
| 5,945,944 | A * | 8/1999 | Krasner | 342/357.06 |
| 6,272,338 | B1 * | 8/2001 | Modzelesky et al. | 455/430 |
| 6,452,961 | B1 * | 9/2002 | Van Wechel | 375/142 |
| 7,053,824 | B2 * | 5/2006 | Abraham | 342/357.1 |
| 7,609,610 | B2 * | 10/2009 | Abe et al. | 370/204 |
| 2002/0136340 | A1 * | 9/2002 | Enam et al. | 375/373 |
| 2005/0162314 | A1 * | 7/2005 | Bromley et al. | 342/387 |
| 2006/0181453 | A1 * | 8/2006 | King et al. | 342/357.06 |
| 2006/0244658 | A1 * | 11/2006 | Abraham | 342/357.15 |
| 2007/0263735 | A1 * | 11/2007 | Tong et al. | 375/260 |
| 2008/0130796 | A1 * | 6/2008 | Rouxel et al. | 375/341 |
| 2008/0192622 | A1 * | 8/2008 | Scheim et al. | 370/210 |
| 2009/0046818 | A1 * | 2/2009 | Murakami et al. | 375/341 |
| 2009/0146871 | A1 * | 6/2009 | Abraham et al. | 342/357.01 |

\* cited by examiner

*Primary Examiner*—Chi H Pham
*Assistant Examiner*—Robert Lopata
(74) *Attorney, Agent, or Firm*—Ronald O. Neerings; Wade James Brady, III; Frederick J. Telecky, Jr.

(57) ABSTRACT

A method and an apparatus to improve sensitivity of decoding time of a global positioning system (GPS) receiver at low signal to noise ratio is disclosed. In one embodiment, a method includes detecting a signal comprised of a data bits, arranging the data bits according to a specified property of an incremental mathematical table (e.g., may be an incremental bit-counter table), storing the data bits when arranging the data bits according to the specified property of the incremental mathematical table as a time counter table, algorithmically determining a value of an unknown data bit of the time counter table according to the specified property of the incremental mathematical table observed in the time counter table to generate a time counter value, and applying the time counter value to decode the signal.

20 Claims, 13 Drawing Sheets

ARRANGE SOFT DATA VALUES IN THE TIME COUNTER TABLE

| S(0,16) | S(0,15) | S(0,14) | S(0,13) | S(0,12) | S(0,11) | S(0,10) | S(0,9) | S(0,8) | S(0,7) | S(0,6) | S(0,5) | S(0,4) | S(0,3) | S(0,2) | S(0,1) | S(0,0) |
|---|---|---|---|---|---|---|---|---|---|---|---|---|---|---|---|---|
| S(1,16) | S(1,15) | S(1,14) | S(1,13) | S(1,12) | S(1,11) | S(1,10) | S(1,9) | S(1,8) | S(1,7) | S(1,6) | S(1,5) | S(1,4) | S(1,3) | S(1,2) | S(1,1) | S(1,0) |
| S(2,16) | S(2,15) | S(2,14) | S(2,13) | S(2,12) | S(2,11) | S(2,10) | S(2,9) | S(2,8) | S(2,7) | S(2,6) | S(2,5) | S(2,4) | S(2,3) | S(2,2) | S(2,1) | S(2,0) |
| ... | ... | ... | ... | ... | ... | ... | ... | ... | ... | ... | ... | ... | ... | ... | ... | ... |
| S(T,16) | S(T,15) | S(T,14) | S(T,13) | S(T,12) | S(T,11) | S(T,10) | S(T,9) | S(T,8) | S(T,7) | S(T,6) | S(T,5) | S(T,4) | S(T,3) | S(T,2) | S(T,1) | S(T,0) |

FIG. 3B

ARRANGE SOFT DATA VALUES IN THE TOW TABLE

| S(0,29) | ... | S(0,2) | S(0,1) | S(0,0) |
|---|---|---|---|---|
| S(1,29) | ... | S(1,2) | S(1,1) | S(1,0) |
| S(2,29) | ... | S(2,2) | S(2,1) | S(2,0) |
| ... | ... | ... | ... | ... |
| S(T,29) | ... | S(T,2) | S(T,1) | S(T,0) |

FIG. 3C

CONTENTS OF HOW WORD

| TOW COUNTER | ALERT FLAG | ANTI SPOOF FLAG | SUB FRAME IDENTIFICATION | PARITY BITS | | |
|---|---|---|---|---|---|---|
| BITS 1:17 | BIT 18 | BIT 19 | BITS 20-22 | BITS 23-28 | 0 | 0 |
| | | | | | BIT 29 | BIT 30 |

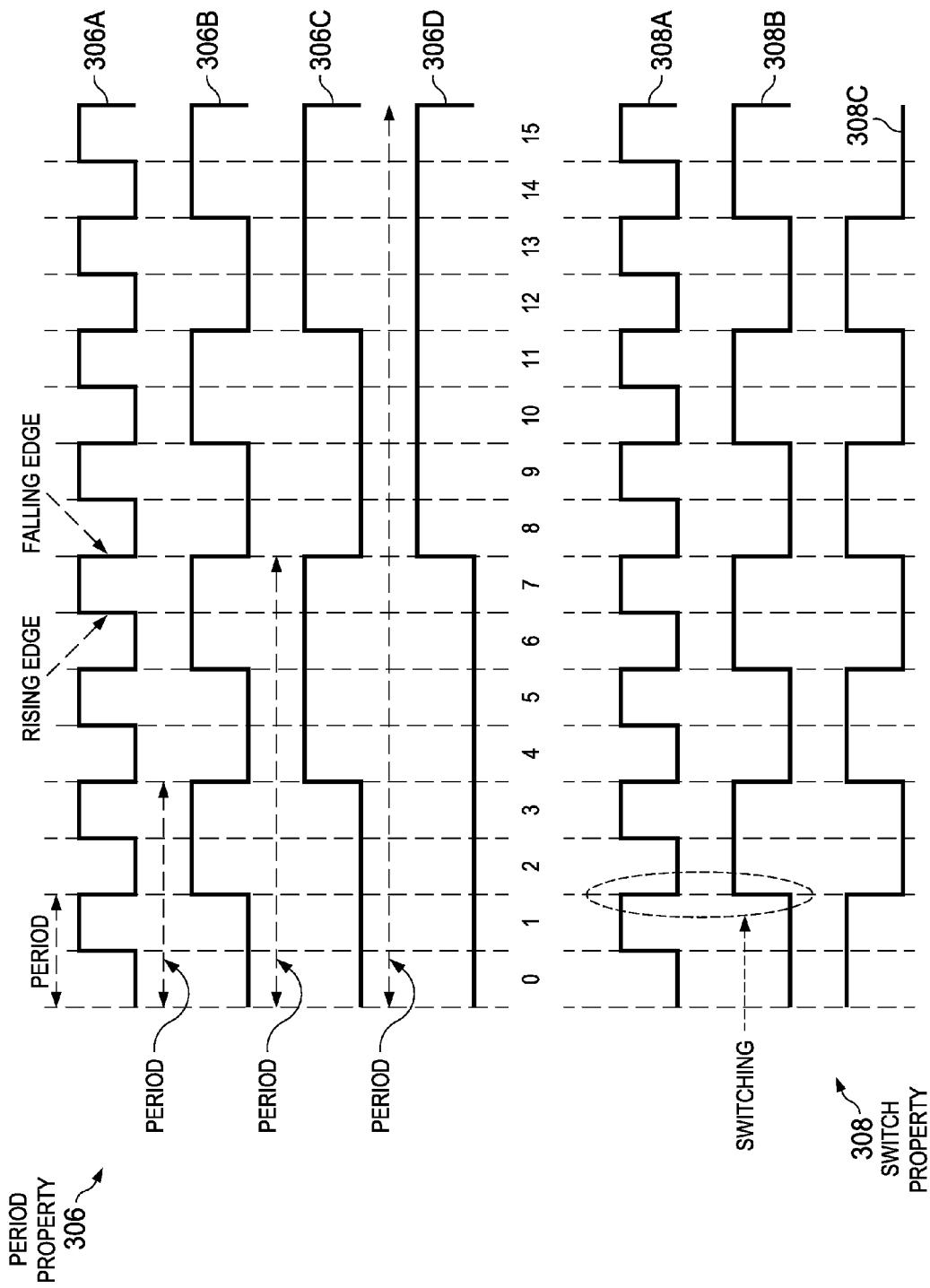

| | SATELLITE | CURRENT | +6 SECONDS | +12 SECONDS | +18 SECONDS | +24 SECONDS | ... |
|---|---|---|---|---|---|---|---|
| 100A | SATELLITE SYSTEM | 10% | 15% | 60% | 85% | 99.99% | ... |
| 100B | SATELLITE SYSTEM | 10% | 15% | 60% | 85% | 99.99% | ... |
| 100C | SATELLITE SYSTEM | 10% | 15% | 60% | 85% | 99.99% | ... |
| 100N | SATELLITE SYSTEM | 10% | 15% | 60% | 85% | 99.99% | ... |

550
IMPROVING ACCURACY OVER TIME INTERVALS
TS (E.G. MULTIPLE TIME INTERVAL MODULE 208)

METHOD TO IMPROVE SENSITIVITY OF DECODING TIME OF A GLOBAL POSITIONING SYSTEM RECEIVER AT LOW SIGNAL TO NOISE RATIO

FIELD OF TECHNOLOGY

This disclosure relates generally to an enterprise method, a technical field of software and/or hardware technology and, in one example embodiment, a method to improve sensitivity of decoding time of a Global Positioning System (GPS) receiver at low signal-to-noise ratio (SNR).

BACKGROUND

A receiver (e.g., the GPS receiver, a Satellite Positioning System (SPS) receiver) may obtain a signal from a satellite constellation (e.g. a plurality of electronic satellites working in concert, a Global'naya Navigatsionnaya Sputnikovaya Sistema (GLONASS) satellite system, a Galileo satellite system, etc.). The signal may enable the receiver to determine a positional information (e.g. a location, a speed, a direction of travel, etc.). The satellite signal may be composed of an ephemeris data (e.g. a set of values that provides the positions of an astronomical object at a given time) and/or a time counter value (e.g. a time of the week value, a time stamp that may be a may be present in a time interval of the satellite signal that provides a seventeen-bit counter time value reset each week). The time counter may increment by a specified time interval.

In a context of the GPS receiver, the time counter value may be a time of the week value. The time of the week value may be a seventeen-bit counter that may increment by one in a sub-frame (e.g. a time interval of a TOW signal). A process of decoding the time of the week value may be a method of decoding time. The time interval may be a sub-frame.

The method of decoding time may be unreliable at a signal-to-noise ratio (e.g. a ratio of a signal power to a noise power corrupting the signal) that is lower than a threshold value. In an environment in which an object impedes a reception of the signal (e.g. a building, a valley wall, an underground location, etc.), the signal-to-noise ratio may decrease. The object may obscure the signal from a satellite. Thus, the SPS receiver may not have a sufficient amount of signal data to determine its position.

Additionally, the method of decoding time may use the SPS receiver to compare an estimated time counter value of a different value of satellites associated with the receiver. The receiver may observe the estimated time counter value received from each of the different satellites in a current time interval. If the receiver is unable to confirm that the estimated time counter value is correct, the receiver may discard the estimated values for the current time interval, and observe estimated time interval values in the next interval. It may take many different time intervals before the time interval value is decoded. As a result, a user of the receiver may have to wait for the receiver to confirm the estimated time interval value for an extended period of time. Valuable time may be lost, making the receiver slow, cumbersome, and difficult to use in many time sensitive environments.

SUMMARY

A method and an apparatus to improve sensitivity of decoding time of a global positioning system (GPS) receiver at low signal to noise ratio is disclosed. A GPS receiver may be a satellite positioning system receiver. In one aspect, a method includes detecting a signal comprised of a plurality of data bits, arranging several data bits according to a specified property of an incremental mathematical table (e.g., may be an incremental bit-counter table), storing several data bits when arranging several data bits according to the specified property of the incremental mathematical table as a time counter table, algorithmically determining a value of an unknown data bit of the time counter table according to the specified property of the incremental mathematical table observed in the time counter table to generate a time counter value, and applying the time counter value to decode the signal.

The method may include observing different data bits of different signals received in adjacent time intervals to determine whether they share the specified property of the incremental mathematical table when algorithmically determining the value of the unknown data bit of the time counter table.

The time counter table may begin at a zero value and/or incrementally increases by a value of one every six seconds for a duration of a calendar week and then resets to the zero value. The algorithmically determining the value of the unknown data bit of the time counter table according to the specified property of the incremental mathematical table may include observing that a higher place data bit value of the time counter table switches from a state to another state when an adjacent lower place data bit value switches from an on-state to an off-state. A differential demodulation may be used by the receiver. A plurality of resolving bits of the differential time counter table may include determining that bits of a higher place data bit value switches from one state to an other state 'T' time instants after an adjacent lower bit place value switches from an off state to an on state, where 'T' is quarter the period of the column corresponding to the lower bit place.

In addition, the algorithmically determining the value of the unknown data bit of the time counter table according to the specified property of the incremental mathematical table may include an observation that a period of alternation between bit states observed in a vertical arrangement of the time counter table increases by a factor of two at each higher bit place in each column of the time counter table. The signal may be a Global Positioning System (GPS) satellite signal received from a satellite. The other signals of at least four satellites may be concurrently processed when decoding the signal.

In another aspect, a method of decoding a signal includes determining that a time counter value is not determinable in a current time interval, storing estimates of the time week value received in the current time interval and a number of additional time intervals in a time counter table, determining that the time counter table having values of the current time interval and the number of additional time intervals share a property with an incremental mathematical table (e.g., may be an incremental bit-counter table), resolving bits of the time counter table using the property shared with the incremental mathematical table, and determining the time counter value based on the resolving bits of the time counter table using the property shared with the incremental mathematical table.

The method may include applying the time counter value and an ephemeris value to determine a global position of a receiver. The method may also include observing different time counter values of different signals received in adjacent time intervals to determine whether they share a property of the incremental mathematical table when resolving bits of the time counter table. The time counter table begins at a zero value and incrementally increases by a value of one every six seconds for a duration of a calendar week and then resets to the zero value.

The resolving bits of the time counter table may include determining that bits of a higher place data bit value of the time counter table switch from a state to another state when an adjacent lower place data bit value switches from an on-state to an off-state. In addition, the resolving bits of the time counter table may include an observation that a period of alternation between bit states observed in a vertical arrangement of the time counter table may increase by a factor of two at each higher bit place in each column of the time counter table. The signal may be a Global Positioning System (GPS) satellite signal received from a satellite. The other signals of at least four satellites may be concurrently processed when decoding the signal.

In yet another aspect, an integrated circuit includes a time counter detector module to detect a signal comprised of several of data bits, a table arrange module to arrange several data bits according to a specified property of an incremental mathematical table, a time counter table to store several data bits when arranging several data bits according to the specified property of the incremental mathematical table, a comparison module to algorithmically determine a value of an unknown data bit of the time counter table according to the specified property of the incremental mathematical table observed in the time counter table to generate a time counter value, and a processor to apply the time counter value to decode the signal.

The integrated circuit may be an application specific integrated circuit designed for communication across different communication protocols including Bluetooth, Global Positioning System (GPS), and/or WiFi. The method may include a multiple time interval module to observe different data bits of different signals received in adjacent time intervals to determine whether they share the specified property of the incremental mathematical table when algorithmically determining the value of the unknown data bit of the time counter table.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 3B is a table view of arrangement of soft data values in the time counter table 210, according to one embodiment.

FIG. 3C is a table view of arrangement of soft data values in the time counter table 210, according to one embodiment.

FIG. 3D is a table view of contents of HOW word, according to one embodiment.

FIG. 3E is a table view of a differential time counter (such as TOW) where the adjacent bits have been logically combined (e.g., may be by using an XOR operation), according to one embodiment.

FIG. 4 is a diagrammatic view illustrating wave forms along with period property and switch property, according to one embodiment.

Other features of the present embodiments will be apparent from the accompanying drawings and from the detailed description that follows.

DETAILED DESCRIPTION

A method to improve the sensitivity of decoding time of a global positioning system receiver at low signal to noise ratio are disclosed. Although the present embodiments have been described with reference to specific example embodiments, it will be evident that various modifications and changes may be made to these embodiments without departing from the broader spirit and scope of the various embodiments.

In one embodiment, a method includes detecting a signal (e.g., may be a global positioning satellite signal) comprised of a data bits (e.g., the global positioning signal composed of data), arranging the data bits according to a specified property of an incremental mathematical table (e.g., the incremental mathematical table 218 of FIG. 2A) (e.g., may be an incremental bit-counter table), storing the data bits (e.g., may be in the time counter table) when arranging the data bits according to the specified property of the incremental mathematical table 218 (e.g., using the table arrange module 212 of FIG. 2A) as a time counter table (e.g., the time counter table 210 of FIG. 2A), algorithmically determining (e.g., using the comparison module 204 of FIG. 2A) a value of an unknown data bit of the time counter table 210 according to the specified property of the incremental mathematical table 218 observed in the time counter table 210 to generate a time counter value (e.g., the time counter value 220 of FIG. 2A), and applying the time counter value 220 to decode the signal.

Figure 2A:
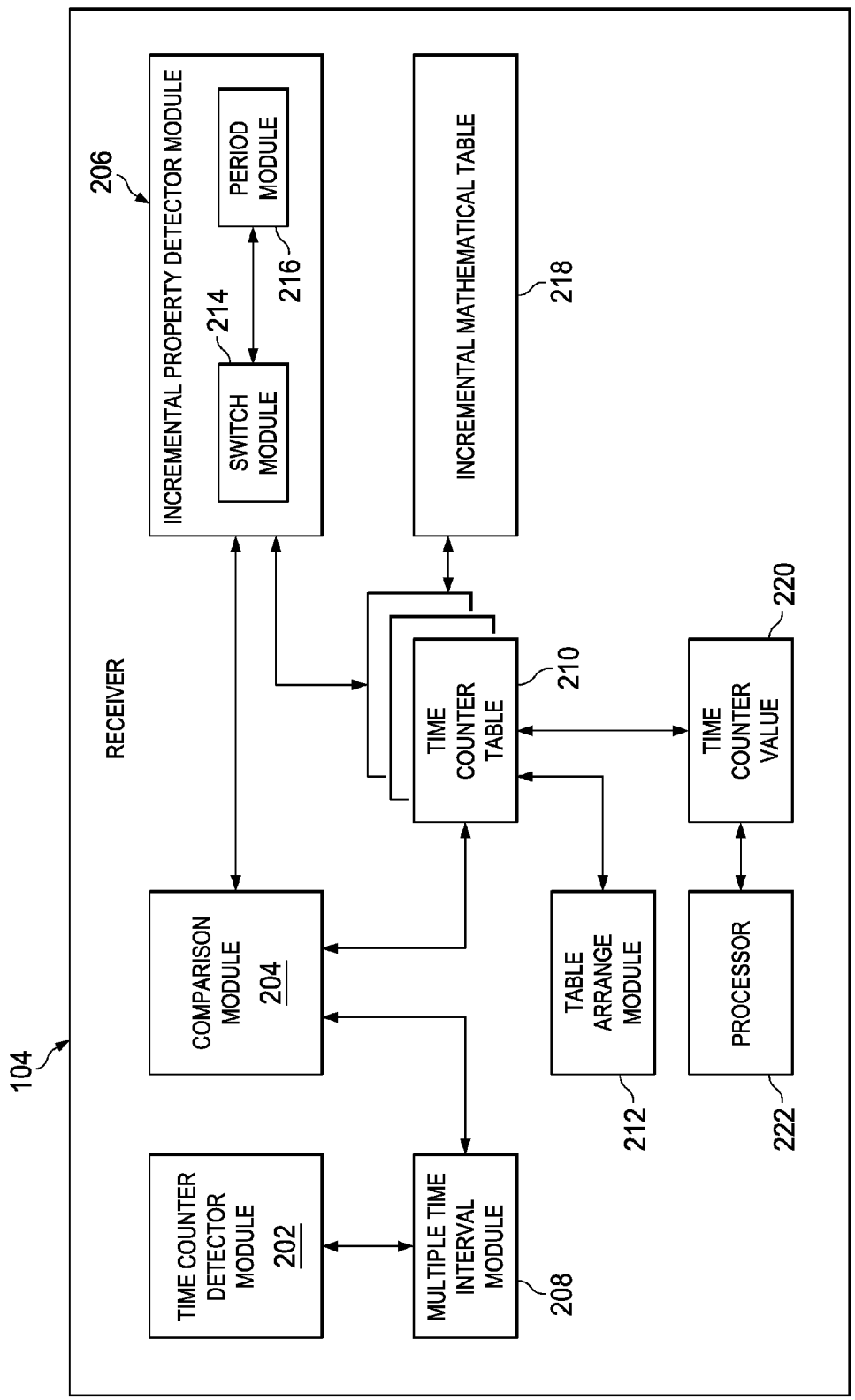
FIG. 2A is an exploded view of a GPS receiver, according to one embodiment.

In another embodiment, a method of decoding a signal (e.g., may be a global positioning signal) includes determining that a time counter value (e.g., the time counter value 220 of FIG. 2A) is not determinable in a current time interval, storing estimates of the time counter value 220 received in the current time interval and a number of additional time intervals in a time counter table (e.g., the time counter table 210 of FIG. 2A), determining that the time counter table 210 having values of the current time interval and the number of additional time intervals share a property with an incremental mathematical table (e.g., the incremental mathematical table 218 of FIG. 2A)(e.g., is an incremental bit-counter table), resolving bits of the time counter table 210 using the property shared with the incremental mathematical table 218 (e.g., as illustrated in FIG. 2A) and determining the time counter value 220 based on the resolving bits of the time counter table 210 using the property shared with the incremental mathematical table 218.

In yet another embodiment, an integrated circuit includes a time counter detector module (e.g., the time counter detector module 202 of FIG. 2A, a time of the week detector module) to detect a signal (e.g., may be a global positioning signal) comprised of a data bits (e.g., global positioning signal composed of data bits), a table arrange module (e.g., the table arrange module 212 of FIG. 2A) to arrange the data bits according to a specified property of an incremental mathematical table (e.g., the incremental mathematical table 218 of FIG. 2A), a time counter table (e.g., the time counter table 210 of FIG. 2A, a time of the week detector table) to store the data bits when arranging the data bits according to the specified property of the incremental mathematical table 218, a comparison module (e.g., the comparison module 204 of FIG. 2A) to algorithmically determine a value of an unknown data bit of the time counter table 210 according to the specified property of the incremental mathematical table 218 observed in the time counter table 210 to generate a time counter value (e.g., the time counter value 220 of FIG. 2A, a time of the week detector value), and a processor (e.g., the processor 222 of FIG. 2A) to apply the time counter value 220 to decode the signal.

Figure 1:
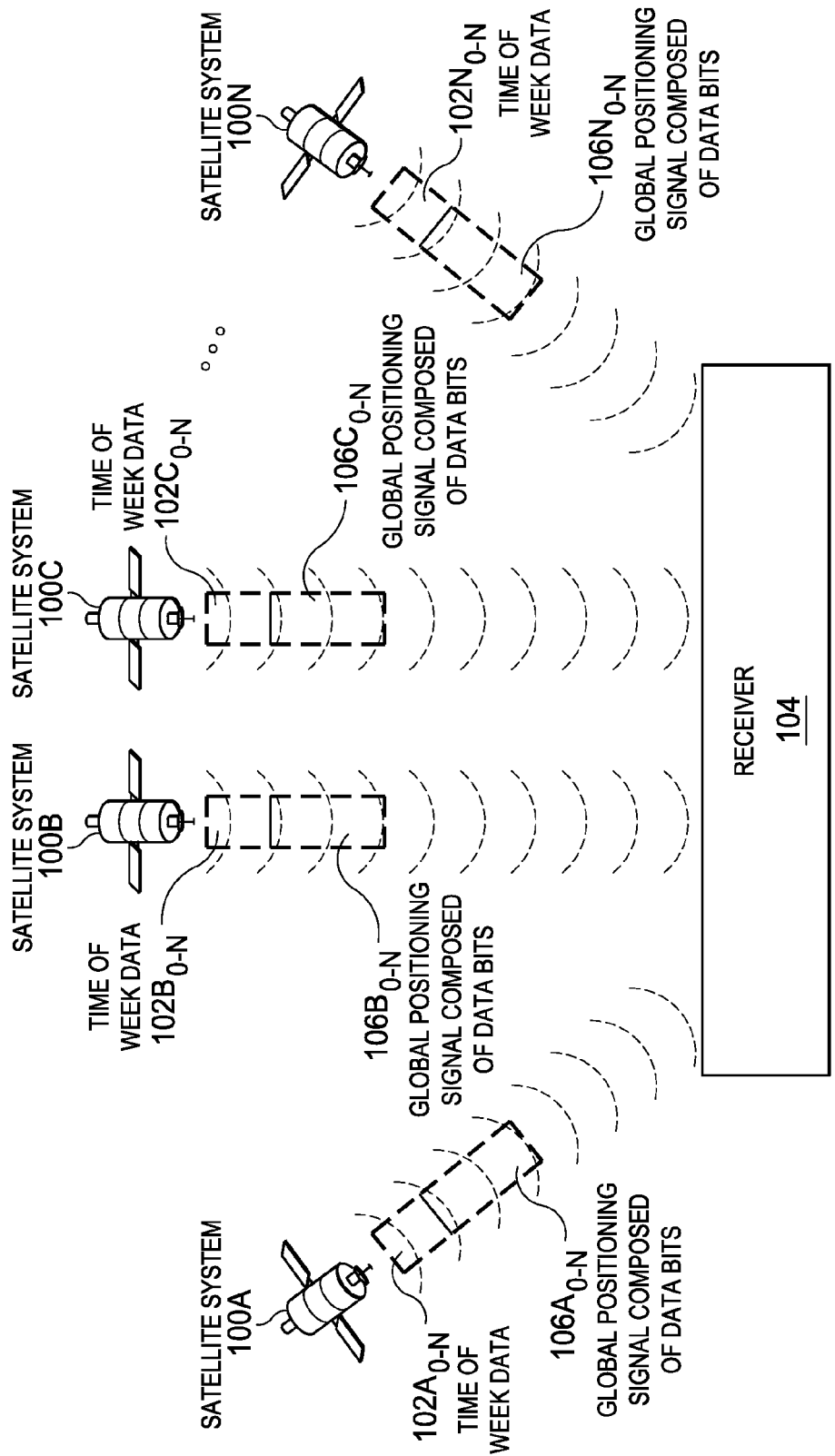
FIG. 1 is a system view of a receiver receiving global positioning signal that includes time counter data, according to one embodiment.

FIG. 1 is a system view of a receiver receiving a global positioning signal that includes time counter data, according to one embodiment. Particularly, FIG. 1 illustrates satellite systems 100-N, a time counter data $102A$-$N_{0-N}$, a receiver 104, and a global positioning signal composed of data bits $106A_{0-n}$-$N_{0-n}$, according to one embodiment.

The satellite systems 100A-N may be a man made earth orbiting device used for receiving and/or transmitting signals (e.g., may include global positioning satellite signal) through its transponders. The time counter data $102A$-$N_{0-n}$ may be a time stamp that may be present in every time interval (e.g., 17 bit counter) of the GPS navigation data that may indicate the time passed from the last change of GPS week. The receiver 104 may receive the information (e.g., global positioning signal) to decode the time counter data to compute an estimate the global position of a receiver's position. The global positioning signal composed of data bits $106A$-$N_{0-n}$ may be the signal (e.g., low power radio signals that may be designated as L1 or L2) from multiple satellites which may be received by the receiver 104 that may contain a pseudorandom code, ephemeris data and/or almanac data along with the time counter data $102A_{0-N}$-$N_{0-N}$.

In example embodiment, FIG. 1 illustrates the satellite systems 100A-N transmitting the global positioning signal composed of data bits $106A_{0-N}$-$N_{0-N}$ which may include time counter data $102A_{0-N}$-$N_{0-N}$. The receiver 104 may receive the signal (e.g., the global positioning satellite signal) and processes (e.g., decodes) it by applying the time counter value.

In one embodiment, the signal may be a Global Positioning System (GPS) satellite signal received from a satellite (e.g., as illustrated in FIG. 1). The other signals of other satellites (e.g., may be at least four) may be concurrently processed when decoding the signal (e.g., GPS signal). The time counter value 220 and an ephemeris value may be applied to determine a global position of the receiver 104. The signal may be a Global Positioning System (GPS) satellite signal received from a satellite (e.g., as illustrated in FIG. 1).

FIG. 2A is an exploded view of a receiver 104, according to one embodiment. Particularly, FIG. 2A illustrates a time counter detector module 202, a comparison module 204, an incremental property detector module 206, a multiple time interval module 208, a time counter table 210, a table arrange module 212, a switch module 214, a period module 216, an incremental mathematical table 218, a time counter value 220, and a processor 222, according to one embodiment.

The time counter detector module 202 may detect global positioning signals (e.g., that may be transmitted from the satellite systems 100A-N) along with time counter data $102A_{0-N}$-$N_{0-N}$ bits. The comparison module 204 may algorithmically compare a value of an unknown data bit of the time counter table 210 in relation to the specified property (e.g., may be the period property 306 and/or the switch property 308) of the incremental mathematical table 218. The incremental property detector module 206 may detect the increments in the incremental mathematical table 218 (e.g., which may be a bit-counter table). The multiple time interval module 208 may observe the received different data bits which may have different signals in adjacent time intervals. The time counter table 210 may store the data bits when arranging the data bits according to a specified property of the incremental mathematical table 218.

The table arrange module 212 may arrange the data bits according to specified property of an incremental mathematical table 218. The switch module 214 may detect switching in time counter data $102A_{0-N}$ from a state to another state when an adjacent lower place data bit value switches from an on-state to an off-state in the time counter table 210 (e.g., as illustrated in FIG. 3 and as detection of falling edge in FIG. 4). The period module 216 may detect/observe the period of alternation between the data bit states observed in a vertical arrangement of the time counter table increases by a factor of two at each higher bit place in each column of the time counter table. The incremental mathematical table 218 may be a table which may be an incremental bit-counter table which may increment the 17 bit counter in every time interval (e.g. sub-frame of a TOW signal). The time counter value 220 may be the value of the counter data bits which may be determined algorithmically from the time counter table. The processor 222 may decode the signal by applying the time counter value.

In example embodiment, FIG. 2A illustrates the time counter detector module 202 communicating with the multiple time interval module 208. The multiple time interval module 208 may communicate with the comparison module 204. The comparison module 204 may communicate with the time counter table 210. The time counter table 210 may communicate with the incremental property detector module 206 the incremental mathematical table 218, the time counter value 220, and/or the table arrange module 212. The incremental property detector module 206 may include the switch module 214 and the period module 216 communicating with each other. The incremental property detector module 206 may also communicate with the comparison module 204. The processor 222 may communicate with the time counter value 220.

In one embodiment, a signal comprised of data bits (e.g., the global positioning signal composed of data bits) may be detected (e.g., using the time counter detector module 202 of FIG. 2A). The data bits may be arranged (e.g., using the table arrange module 212 of FIG. 2A) according to a specified property of the incremental mathematical table 218. The data bits may be stored (e.g., may be in time of week table) when arranging the data bits according to the specified property of the incremental mathematical table 218 as the time counter table 210.

The value of an unknown data bit of the time counter table 210 may be algorithmically determined (e.g., using the comparison module 204 of FIG. 2A) according to the specified property of the incremental mathematical table 218 observed (e.g., using the multiple time interval module 208 of FIG. 2A) in the time counter table 210 to generate the time counter value 220. The time counter value 220 may be applied to decode the signal (e.g., using the processor 222 of FIG. 2A). Different data bits of different signals received in adjacent time intervals may be observed (e.g., using the multiple time interval module 208 of FIG. 2A) to determine whether they share the specified property of the incremental mathematical table 218 (e.g., using the multiple time interval module 208 of FIG. 2A) when algorithmically determining the value of the unknown data bit of the time counter table 210.

The incremental mathematical table 218 may be an incremental bit-counter table. The time counter table 210 may begin at a zero value and incrementally increases by a value of one every six seconds for a duration of a calendar week and then resets to the zero value. The value of the unknown data bit of the time counter table 210 may be algorithmically determined (e.g., using the comparison module 204 of FIG. 2A) according to the specified property may include observing that a higher place data bit value of the time counter table 210 may switch from a state to another state when an adjacent lower place data bit value switches from an on-state to an off-state (e.g., using the switch module 214 of the incremental property detector module 206 of FIG. 2A).

The value of the unknown data bit of the time counter table 210 may be algorithmically determined according to the specified property of a mathematical table (e.g., using the incremental property detector module 206 of FIG. 2A) and may include an observation that a period of alternation between bit states observed (e.g., using the multiple time interval module 208 of FIG. 2A) in a vertical arrangement of the time counter table 210 may increase by a factor of two at each higher bit place in each column of the time counter table 210. It may be determined that the time counter value 220 may not be determinable in a current time interval. Estimates of the time counter value 220 received in the current time interval and/or a number of additional time intervals may be stored in the time counter table 210. It may be determined that the time counter table 220 having values of the current time interval and the number of additional time intervals may share a property with an incremental mathematical table 218 (e.g., using the incremental property detector module 206 of FIG. 2A).

A bit of the time counter table 210 may be resolved using the property shared with the incremental mathematical table 218. The time counter value 220 based on the resolving bits of the time counter table 210 may be determined using the property shared with the incremental mathematical table 218. Different time counter values of different signals received in adjacent time intervals may be observed (e.g., using the multiple time interval module 208 of FIG. 2A) to determine whether they share a property of the incremental mathematical table 218 when resolving bits of the time counter table 210 (e.g., using the multiple time interval module 208 of FIG. 2A). The incremental mathematical table 218 may be an incremental bit-counter table.

The time counter table 210 may begin at a zero value and may incrementally increase by a value of one every six seconds for a duration of a calendar week and then reset to the zero value. The resolving of a bit of the time counter table 210 may include determining that the bit of a higher place data bit value of the time counter table 210 switch from a state to another state when an adjacent lower place data bit value switches from an on-state to an off-state (e.g., using the switch module 214 of incremental property detector module 206 of FIG. 2A). The resolving of a bit of the time counter table 210 may include an observation that a period of alternation between observed bit states (e.g., using the multiple time interval module 208 of FIG. 2A) in a vertical arrangement of the time counter table 210 increases by a factor of two at each higher bit place in each column of the time counter table 220. The time counter detector module 202 may detect a signal comprised of data bits.

The table arrange module 212 may arrange the data bits according to a specified property of the incremental mathematical table 218. The time counter table 210 may store the data bits when arranging the data bits according to the specified property of the incremental mathematical table 218. The comparison module 204 may algorithmically determine a value of an unknown data bit of the time counter table 210 according to the specified property of the incremental mathematical table 218 observed (e.g., using the multiple time interval module 208 of FIG. 2A) in the time counter table 210 to generate the time counter value 220. The processor 222 may apply the time counter value 220 to decode the signal.

The integrated circuit may be an application specific integrated circuit designed for communication across different communication protocols may include Bluetooth, Global Positioning System (GPS), and/or WiFi. The multiple time interval module 208 may observe (e.g., using the multiple time interval module 208 of FIG. 2A) different data bits of different signals received in adjacent time intervals to determine whether they share the specified property of the incremental mathematical table 218 when algorithmically determining the value of the unknown data bit of the time counter table 210.

Figure 2B:
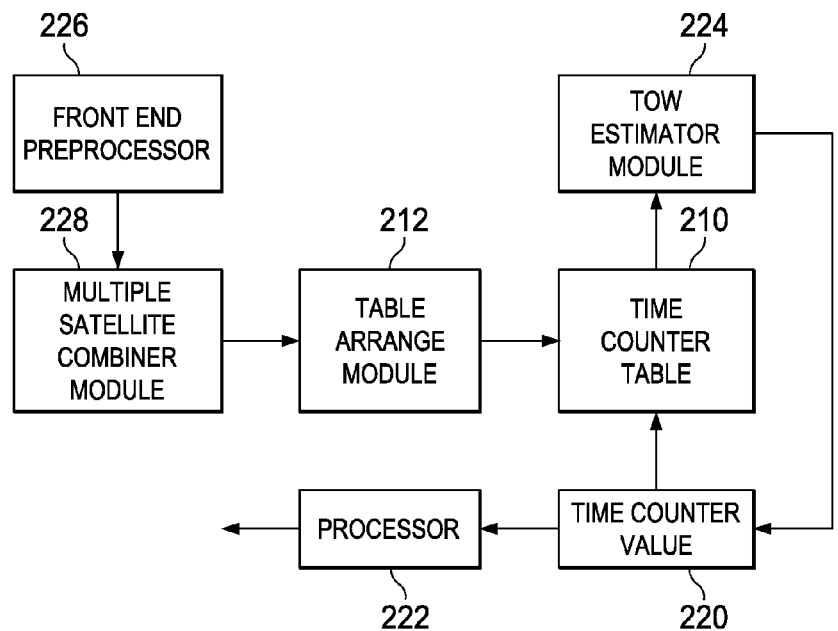
FIG. 2B is a system view illustrating a portion of the GPS receiver which may be used to calculate the receiver position, according to one embodiment.

FIG. 2B is a system view illustrating a portion of the GPS receiver which may be used to calculate the receiver position, according to one embodiment. Particularly, FIG. 2B illustrates the front end preprocessor 226, multiple satellite combiner module 228, table arrange module 212, time counter table 210, a TOW estimator module 224, a time counter value 220 and a processor 222, according to one embodiment.

In the example embodiment, the front end preprocessor 226 may communicate with the multiple satellite combiner module 228. The multiple satellite combiner module 228 may communicate with the table arrange module 212. The table arrange module 212 may communicate with the time counter table 210. The time counter table 210 may communicate with the TOW estimator module 224. The TOW estimator module 224 outputs the time counter value 220. The time counter value 220 is used by the processor 222.

In this embodiment, the receiver may observe the satellite signals from one or more satellites that are visible to the receiver. Each received satellite signal may be preprocessed by the front end preprocessor 226. The preprocessing may include down converting each satellite signal to baseband, correlating with the PN sequence to despread the signal and then demodulating the signal (e.g., that may include GPS data). In addition, the signal samples may be quantized (e.g., converting the signal to digital signal taking the closest approximate DC value) to multiple levels that may yield a signal sample commonly referred to as a 'soft decision value' or a 'soft decision bit'.

The front end preprocessor 226 may produce a single soft decision value for each 20 ms data bit transmitted by each satellite. For each satellite, the 17 soft decision values corresponding to the time counter value 220 in each sub-frame are sent to the multiple satellite combiner module 228 (e.g. $S_n$ (t, 0), $S_n$ (t, 1), ..., $S_n$ (t, 16) may refer to the 17 soft decision values corresponding to the TOW from the $n^{th}$ satellite for the $t^{th}$ consecutive sub-frame received). In the multiple satellite combiner module 228, in each sub-frame t, the soft decision values from all the satellites for a specific bit place of the TOW may be summed up to obtain one soft decision data value per TOW bit place of the TOW. This may be illustrated in the following equation.

$$s(t, k) = \sum_{j=0}^{N-1} s_j(t, k) \qquad \text{eq (2)}$$

The combined soft decision values [S(t,0), S(t,1) ... S(t,16)] may then be sent to the table arrange module 212.

The table arrange module 212 from each sub-frame may pick up the 17 soft decision data values corresponding to TOW in that particular sub-frame. The table arrange module 212 may also store this data in a time counter table 210 (e.g., may be s(0,0) s(0,1), ... s(0,16) refers to the 17 soft decision data values from the first sub-frame received). Similarly, s(t, 0) ... s(t,17) would refer to the 17 soft decision data values from the $t^{th}$ consecutive sub-frame received (e.g., as illustrated in FIG. 3B). Each place of the 17 bit counter may be stored in one column (e.g., may be the least significant bit to the most significant bit moving from right to left).

The TOW estimator module 224 may observe the soft decision values in the time counter table 210 and in conjunction with the two properties of a counter table may estimate the value of the TOW. The TOW estimator module 224 may output the estimated the time counter value 220 which may then be used by the processor 222 to calculate the receiver's position.

Figure 2C:
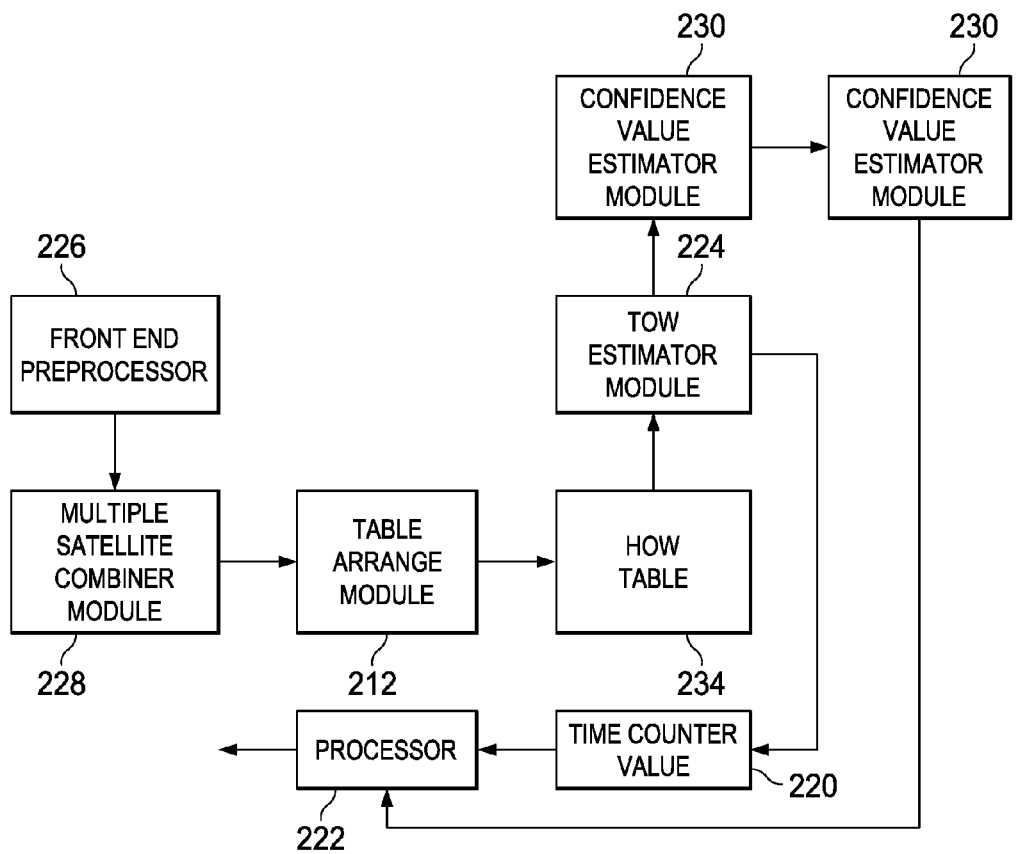
FIG. 2C is a system view illustrating a portion of the GPS receiver including the confidence value estimator module 230, according to one embodiment.

FIG. 2C is a system view illustrating a portion of the GPS receiver including the confidence value estimator module 230, according to one embodiment. Particularly, FIG. 2C illustrates the front end preprocessor 226, the multiple satellite combiner module 228, table arrange module 212, HOW table 234, the TOW estimator module 224, a time counter value 220, a confidence value estimator module 230, a confidence value 232 and a processor 222.

The confidence value estimator module 230 may estimate the confidence value required for determination of the estimated time counter value. The confidence value 232 may be used to determine if the estimated time counter value may have sufficient accuracy for computation of the position. The HOW table 234 (e.g., hand over word) may be a table that stores the soft decision bits corresponding to the HOW word in successive frames.

In example embodiment, the front end preprocessor 226 may communicate with the multiple satellite combiner module 228. The multiple satellite combiner module 228 may communicate with the table arrange module 212. The table arrange module 212 may communicate with the HOW table 234. The HOW table 234 may communicate with the TOW estimator module 224. The confidence value estimator module 230 may communicate with the confidence value 232, and the time counter value 220. The confidence value 232 may communicate with the time counter value 220, and the processor 222.

In this embodiment, the receiver 104 may include a method to determine the confidence value in the TOW estimated by the TOW estimator. Such the receiver 104 may include a confidence value estimator module 230. The TOW table from FIG. 2B has been replaced by a HOW table 234 in FIG. 2C. The HOW word may be a 30 bit word transmitted by GPS satellites in every sub-frame, which may include in addition to the 17 bit TOW, 13 other bits including a 3 bit sub-frame id and/or a 6 parity bits. The multiple satellite combiner module 228 may provide the table arrange module with 30 soft decision values [S(t,0), S(t,1) ... S(t,29)] per sub-frame, corresponding to the 30 place values of the HOW word.

The table arrange module 212 may arrange these soft decision values (e.g., as illustrated in FIG. 3C). The TOW Estimator module may work as before utilizing just the TOW part of the HOW table 234. The confidence value estimator module 230 may use the HOW table 234 and/or the time counter value estimated by the TOW estimator module 224 to compute a confidence value 232. The confidence value may be used by the processor module to determine if the time counter value 220 that may be of sufficient accuracy to be used in computation of the position.

Figure 2D:
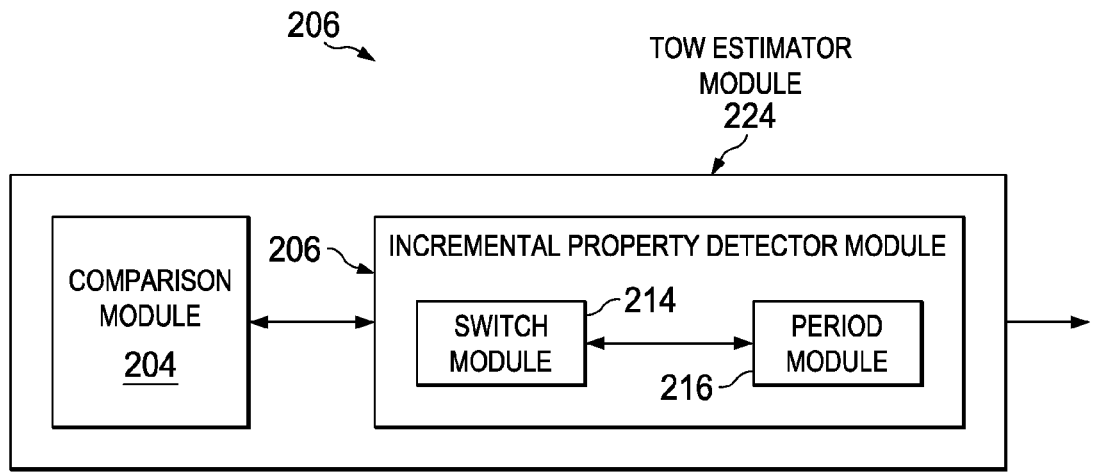
FIG. 2D is an exploded view of the TOW estimator module 224 of FIG. 2B which may use a switch property and a period property to estimate the value of TOW, according to one embodiment.

FIG. 2D is an exploded view of the TOW estimator module 224 of FIG. 2B which may use a switch property and a period property to estimate the value of TOW, according to one embodiment. Particularly, FIG. 2B illustrates the comparison module 204, the incremental property detector module 206, which includes the switch module 214 and the period module 216, according to one embodiment.

In this embodiment the TOW estimator module may estimate the TOW bits sequentially starting from the least significant bit and working its way to the most significant bit. In each stage, the switch module 214 and the period module 216 together may compute the two possible waveforms (e.g., as illustrated in 308B and 308C of FIG. 3) for the next adjacent column. The comparison module 204 may then correlate the soft decision data stored in the next adjacent column with both the waveforms 308B and 308C to decide which is the right waveform. Since the two possible waveforms for the next adjacent column may be always complements of each other, the correct waveform for the next adjacent column may be determined. In the embodiment, by first computing the following expression $\Sigma C_{308a}(k) \cdot s(k, j)$ and it may be chosen that 308A as the correct waveform if this expression is positive, and may chose the waveforms 308B otherwise. In the above equation, 308A may be a +1/−1 representation of the waveform in C308A.

Figure 2E:
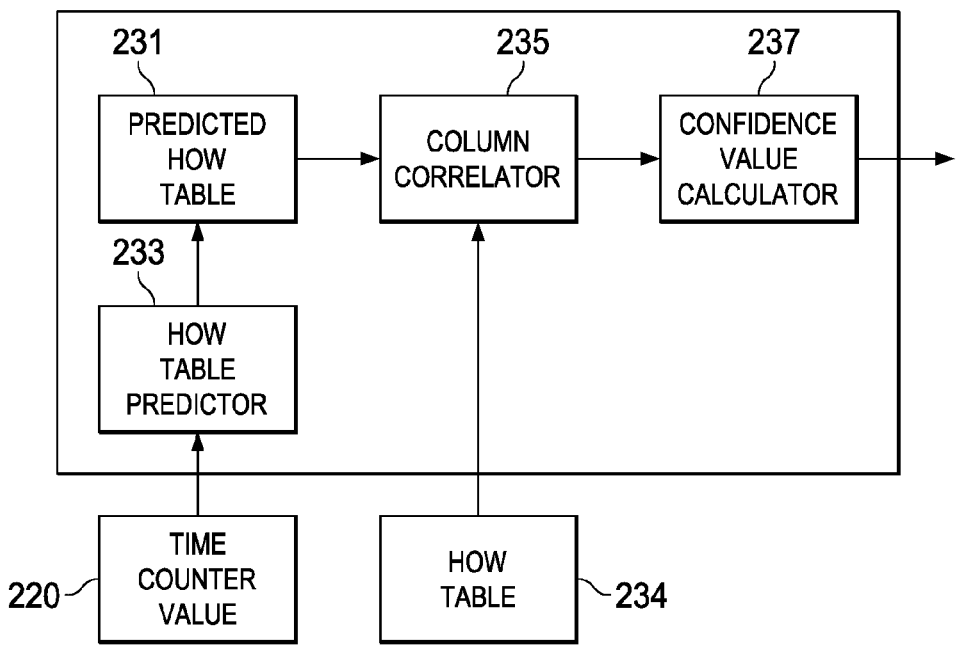
FIG. 2E is an exploded view of confidence value estimator module 230 of FIG. 2D, according to one embodiment.

FIG. 2E is an exploded view of confidence value estimator module 230 of FIG. 2C, according to one embodiment. Particularly, FIG. 2E illustrates the time counter value 220, the HOW table 227, a HOW table predictor 233, a predicted HOW table 231, a column correlator 235 and a confidence value calculator 237 according to one embodiment.

The time counter value 220 may be the value of the TOW estimated by the TOW Estimator module. The HOW table 227 may store the soft decision values of the HOW word received from successive sub-frames. The HOW table predictor 233 may predict the ideal values of the successive columns of the HOW table 227 using the time counter value 220. The predicted HOW table 231 may store the ideal values generated by the HOW table predictor 233. The column correlator 235 may correlate the values from each column of the HOW table 227 with the corresponding column of the predicted HOW table 231. The confidence value calculator 237 may use the correlation values output by the column correlator 235 to estimate whether the time counter value 220 is right In this example embodiment, the HOW Table Predictor 233 may predict the ideal values of the successive columns of the HOW table 227 (e.g., under the assumption that the TOW value is correct) and place the ideal values ('0' or '1' for element in the table) in the predicted HOW table 231. As an example, the TOW values placed in columns C1 to C17 of the predicted HOW table 231 may be the consecutive values starting from the time counter value 220. The columns C18 and C19 can be assumed to be constant bit values and may be estimated by summing the soft decision values of the corresponding columns in the HOW table 227 and hard limiting these sums. The columns C20-C22 may contain the sub-frame id of the GPS sub-frame. These may be directly calculated using the values of the TOW (C1-C17). The parity bits C23-C28 may be computed from the bits in C1-C22 as per the GPS specification. In addition, the last two bits C29 and C30 may be set to zero as per the GPS specification.

The soft decision values from each column of the HOW Table 227 may be compared with the corresponding column of the predicted HOW table 231 with a closer match between the two indicating greater confidence in the estimated time counter value. In the embodiment this comparison between the tables may be achieved by the column correlator 235 by correlating the values from each column of the HOW Table 227 with the corresponding column of the predicted HOW table 231. For the $k^{th}$ column, this correlation may be computed as:

$$corr(k) = \sum_{j} C(j,k)s(j,k),$$

where C(j,k) refers to the values in the $j^{th}$ row and $k^{th}$ column of the predicted HOW table 231. (Note: when computing the correlation a '0' value in the HOW table 227 may be interpreted as −1 and a '1' value may be interpreted as '1').

The confidence value calculator 237 calculate the correlation values ([corr(0) corr(1) . . . corr(29)], for each of the columns of the HOW table, to estimate if the TOW value is correct. If the TOW value is correct, the confidence value calculator 244 may output a '1', otherwise a '0'. Various metrics may be used by the confidence value calculator 237 to estimate if the time counter value 220 is correct. In one embodiment the Confidence value calculator 237 may declare a '1' if corr(k) is greater than some threshold T for each column. In another embodiment the confidence value calculator 237 may declare a '1' if the variance of [corr(0), corr(1) . . . corr(29)] is greater than another threshold 'T'. The values of the thresholds may be calculated by simulation and/or theoretical calculation and/or may vary depending on the integrity needs of each application.

Figure 3A:
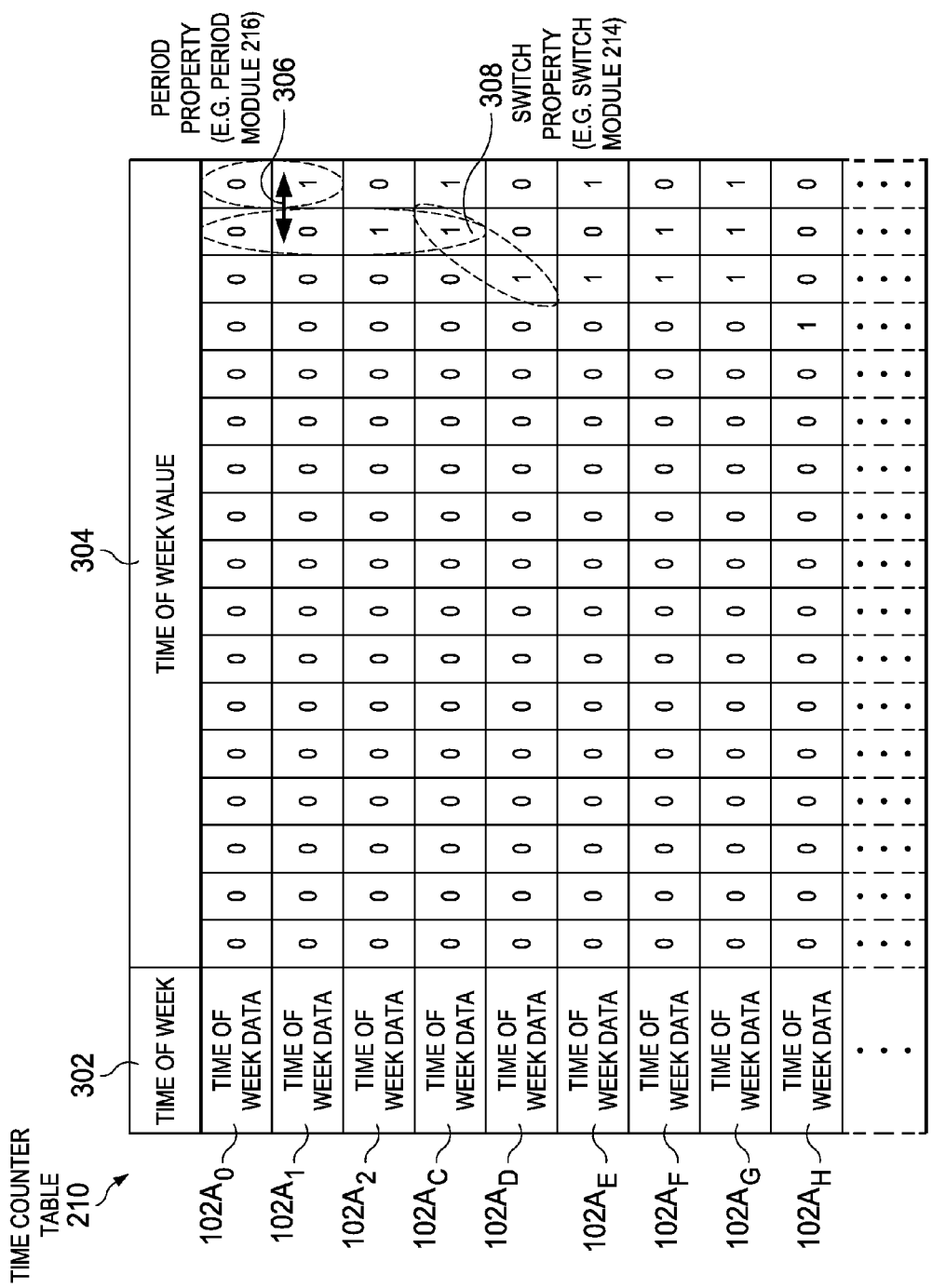
FIG. 3A is a table view of a time counter illustrating successive values of a 17 bit time counter according to one embodiment.

FIG. 3A is a table view of a time counter illustrating successive values of a 17 bit time counter according to one embodiment. Particularly, FIG. 3A illustrates the time counter data $102A_{O-N}$, a time counter 302, the time counter value 304, a period property 306, and a switch property 308, according to one embodiment. The switch property and the period property may be used by the TOW estimator module 224 to estimate the value of the TOW.

In this embodiment, the period property 306 and the switch property 308 may be explained using FIG. 3A as reference. Each column may have a fixed number of 1's followed by the same number of 0's and this property may be referred to as the period of the column. It may be noted that the period increases by a factor two in each higher bit place (i.e., column) of the table. The switch property 308 may refer to the property where a higher place data bit value of the counter switches from one state to another whenever an adjacent lower place bit value switches from an on state ('1') to an off state ('0').

In one embodiment, the time counter table of FIG. 3A may refer to the TOW values. Thus $102A_{O-N}$ may refer to the values of the TOW in successive sub-frames with the values incrementing by one in every successive sub-frame.

FIG. 3B is a table view of arrangement of soft data values in the time counter table 210, according to one embodiment.

In example embodiment, the each rows of the soft data values of the time counter table 210 illustrates 17 soft decision data values in each row from S(0,0) S(0,1), . . . S(0,16) to S(T,16), S(T,15) . . . S(T,0) stored in a decreasing order.

FIG. 3C is a table view of arrangement of soft data values in the time counter table 210, according to one embodiment.

In example embodiment, the first row denotes the arrangement of soft data values from S(0,29) to S(0,0) in decreasing order. The second row of the table denotes the arrangement of soft data values from S(1,29) to S(1,0) in the decreasing order and so on the arrangement may be till S(T, 29) to S(T,0), according to one embodiment.

FIG. 3D is a table view of contents of HOW word, according to one embodiment.

In example embodiment, the first column denotes TOW counter that includes 1 to 17 bits, the second column illustrates the alter flag that may require 1 bit (e.g., $18^{th}$ bit), the third column denotes anti spoof flag that may require 1 bit (e.g., $19^{th}$ bit), the fourth column denotes sub frame ID that may require 3 bit (e.g., $20^{th}$ to $23^{rd}$ bits), the fifth column denotes party bits that may require 6 bits (e.g., $23^{rd}$ to $28^{th}$ bits) and last two bits may be reserved.

Figure 3E:
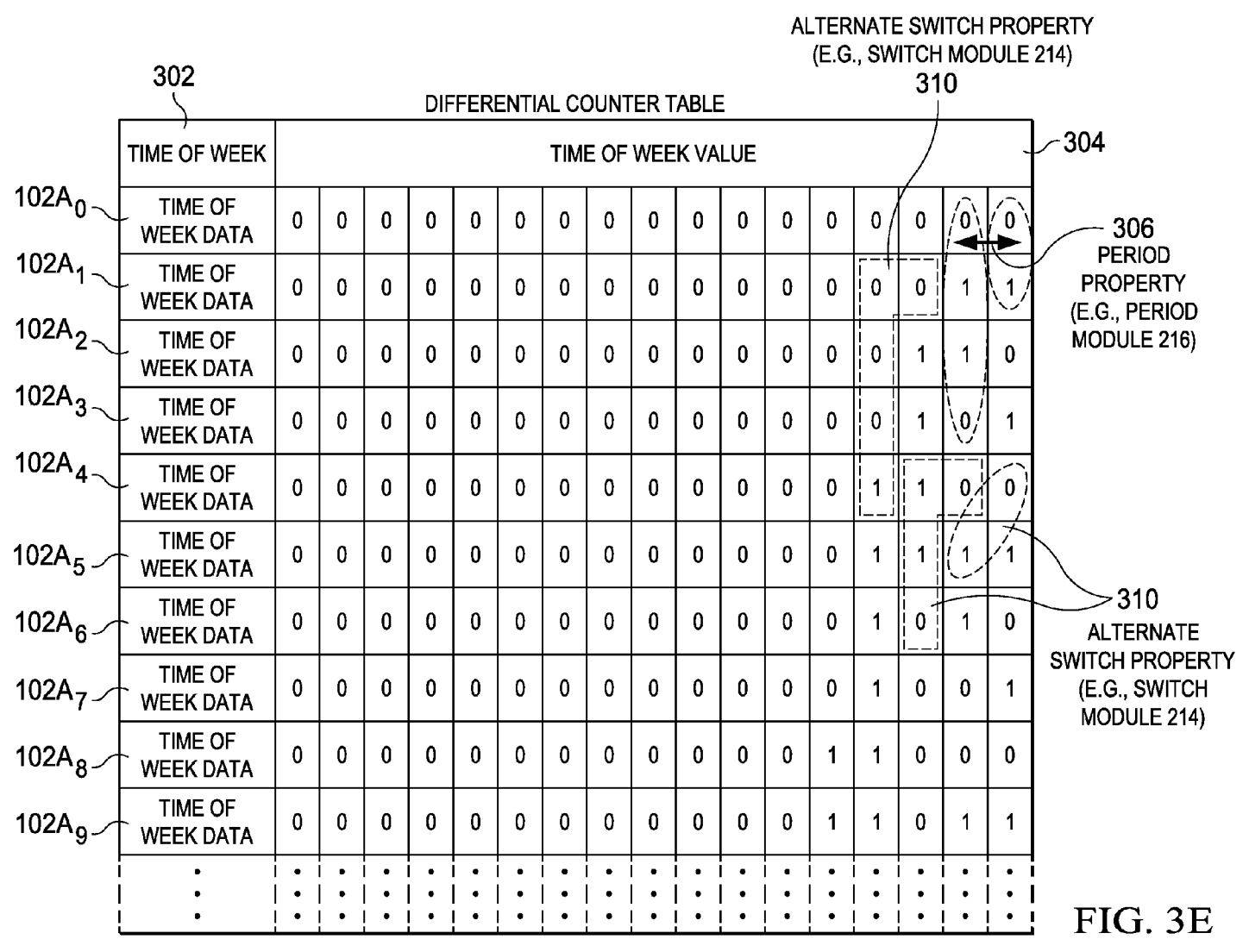

FIG. 3E is a table view of a differential time counter (e.g., such as the TOW) where the adjacent bits have been logically combined (e.g., may be by using an XOR operation), according to one embodiment.

Particularly, FIG. 3E illustrates example of receivers that may differentially demodulate data in compared to coherently demodulating data. The differential demodulation scheme may be typically used to ease the synchronization constraints at the receiver 104. In one embodiment, the processor 222 (e.g., in the FIGS. 2A, 2B and 2C) may choose to output differentially demodulated symbols. In addition, in the differential demodulation, a given soft decision symbol obtained from a satellite signal may be multiplied by the complex conjugate of its preceding soft decision symbol and the inphase component taken to yield what can be referred to as a soft differential symbol or a soft differential bit. The modules associated to the processor 222 (e.g., of FIGS. 2A, 2B and 2C) such as the multiple satellite combiner module 228, the table arrange module 212, the TOW estimator module etc. may now work with the soft differential bits.

When data may be differentially demodulated the adjacent bits of the underlying information bits (e.g., such bits in a time counter, TOW, HOW, etc.) are logically combined according to some logical operation (e.g., the XOR operation). A sequence of information bits obtained after combining may be referred to as being in the 'difference domain'. The original bit sequence (e.g., without 'XOR'ing of adjacent bits) may be referred to as being in the 'absolute domain'.

In one embodiment, the differential demodulation may be used by the receiver 104. The resolving bits of the differential time counter table may include determining that bits of a higher place data bit value switches from one state to an other state 'T' time instants after an adjacent lower bit place value switches from an off state to an on state, where 'T' is quarter the period of the column corresponding to the lower bit place.

In example embodiment, FIG. 3E may be derived from FIG. 3 as follows. In FIG. 3E, the second column from the left may be derived by logical operation (e.g., may be by XORing the corresponding bits in first and second columns (from the left) of FIG. 3). In general the $k^{th}$ column in FIG. 3E may be derived by using the logical operation (e.g., may be by XORing the k and $(k-1)^{th}$ columns from FIG. 3). Also if the first bit preceding the time counter may be assumed to be a constant as per the satellite signal specification, then the first column in FIG. 3E may be derived by the logical operation (e.g., XORing the $1^{st}$ column (left most) of FIG. 3 with this constant value (either '0' or '1')). As an example to obtain the $1^{st}$ column (left most) of FIG. 3E we may assume that the time counter (e.g., such as the TOW) is preceded by a constant with logical value '0'.

In the example embodiment, FIG. 3E may be used to illustrate the switch property 310 and period property 306 modified to the context of differential demodulation at the receiver 104. The period property 306 in FIG. 3E may be the same as in FIG. 3 (e.g., the period may increase by a factor of 2 each as we go from the left column to the right column). However, the switch property 310 may be modified as follows: The higher bit place value may switch from one state to another state, 'T' time instants after an adjacent lower bit place value switches from an off ('0') state to an on ('1') state, where 'T' may be quarter the period of the column corresponding to the lower bit place. The time instant 'T' varies based on factor of '2' moving from lower bit place to higher ones (e.g., as illustrated in FIG. 3E).

The TOW estimator module 224 may use techniques described earlier in conjunction with the modified switch property to estimate the value of the TOW counter in the difference domain. The HOW estimator (e.g., that may include the predicted HOW table 231, the HOW table predictor 233, the column correlator 235, etc.) may also use the techniques described earlier with obvious modifications to accommodate the difference domain. The conversion from the difference domain to the absolute domain in the receiver 104 may be done using bits known a priori to the receiver 104 (e.g., such as the preamble).

FIG. 4 is a diagrammatic view with an alternate depiction of the period property 306 and the switch property 308 according to one embodiment. Particularly, FIG. 4 illustrates the period property 306, wave forms 306A-D, the switch property 308, and waveforms 308A-C, according to one embodiment.

The wave forms 306A-D shows the period property 306 that may illustrate periods of bits, from a lower significant bit (e.g., 306A) through a higher significant bit (e.g., 306D), along with the rising edge and falling edge. Every successive higher significant bit may have twice the period of its preceding bit. The waveforms 306A-D may also illustrate the switch property 308 with the rising or falling edge of every bit lining up with the falling edge of its preceding bit. The waveforms 308A-C may illustrate that once the wave form corresponding to a specific bit place has been identified (e.g., 308A), the period property 306 and switch property 308 may demand that the waveform corresponding to adjacent higher place value be one of two choices (e.g., the 308B and/or its complement waveform 308C).

Figures 5, 7:
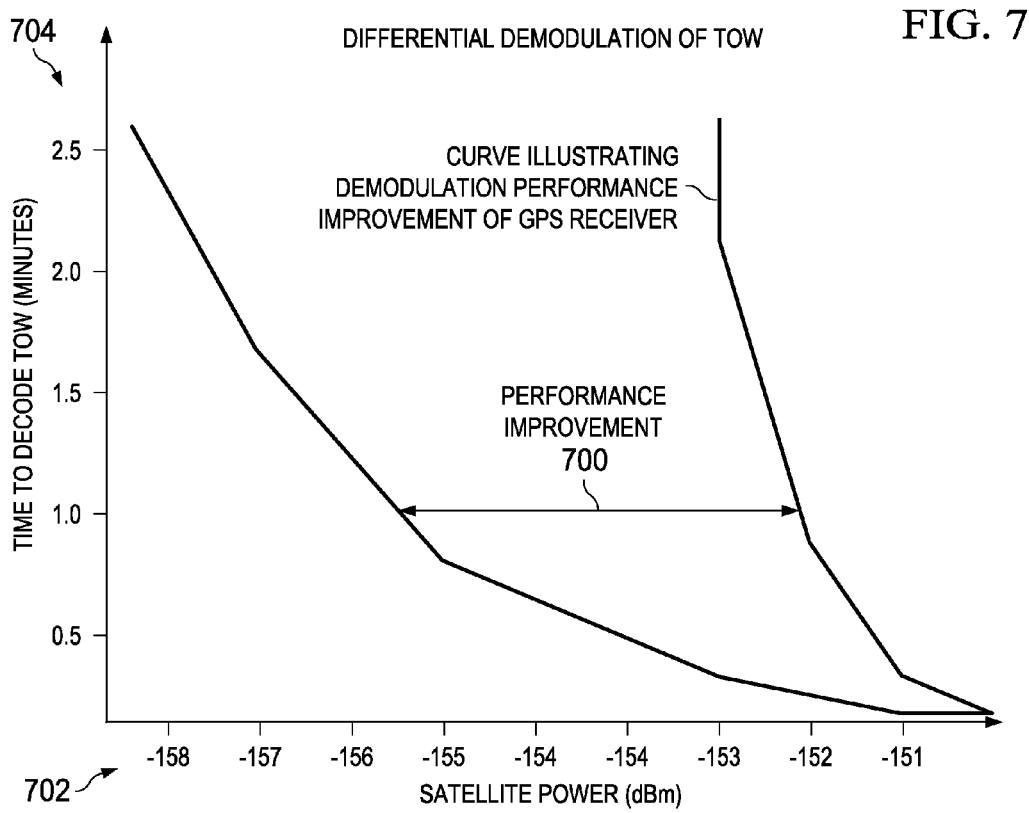
FIG. 5 is a table view illustrating period fields that illustrate improving accuracy over time intervals, according to one embodiment.
FIG. 7 is a graphical view illustrating performance improvement over prior art, according to one embodiment.

FIG. 5 is a table view illustrating period fields that illustrate improving accuracy over time intervals 550, according to one embodiment. Particularly, FIG. 5 illustrates a satellite field 502, a current field 504, a +6 sec field 506, a +12 sec field 508, a +18 sec field 510, and a +24 sec field 512, according to one embodiment.

The satellite field 502 may illustrate the multiple satellite systems which may be transmitting the global positioning signals to the receiver 104. The current field 504 may illustrate the probability of correctly decoding the TOW after combining the time counter data $102_{0-N}$ (e.g. about 10% probability of correct decoding) in the current instant from the satellite systems 100A-N. The +6 sec field 506 may illustrate the percentage of improved probability (e.g., increase to about 15%) after combining the time counter data $102_{0-N}$ obtained from the satellite systems 100A-N across time period from the current field 504 instant to the +6 sec 506 instant. The +12 sec field 508 may illustrate the percentage of improved probability (e.g., to about 60%) by combining the time counter data $102_{0-N}$ obtained from the satellite systems 100A-N across time period from the current field 504 instant to the +12 sec 508 instant. The +18 sec field 510 may illustrate the percentage of improved probability (e.g., to about 85%) by combining the time counter data $102_{0-N}$ obtained from the satellite systems 100A-N across time period from the current field 504 instant to the +18 sec 510 instant. The +24 sec field 512 may illustrate the percentage of improved probability (e.g., to about 99.99%) by combining the time counter data $102_{0-N}$ obtained from the satellite systems 100A-N across time period from the current field 504 instant to the +24 sec 510 instant.

In example embodiment, FIG. 5 illustrates the improving percentage of accuracy by combining the soft decision bits of the time counter across multiple consecutive time interval (e.g., sub-frame of a time of the week signal) obtained from the satellite systems 100A-N. The satellite field 502 column may illustrate the satellite systems 100A in the first row, the satellite system 100B in the second row and so on. The current field 504 column may illustrate 10% probability of correct decoding by combining the soft decision bits of the time counter across consecutive time intervals (e.g., across time). The +6 sec field 506 may illustrate probability of correct decoding of 15% by combining the soft decision bits of time counter across consecutive time intervals (e.g., across time from the current field 504 instant until +5 sec 506 instant). Similarly, the +12 sec field 508 may illustrates probability of correct decoding of 60%, +18 sec field 510 may illustrate probability of correct decoding of 85%, +24 sec field 512 may illustrate probability of correct decoding of 99.99% by combining the soft decision bits of time counter across consecutive time intervals respectively.

Figure 6:
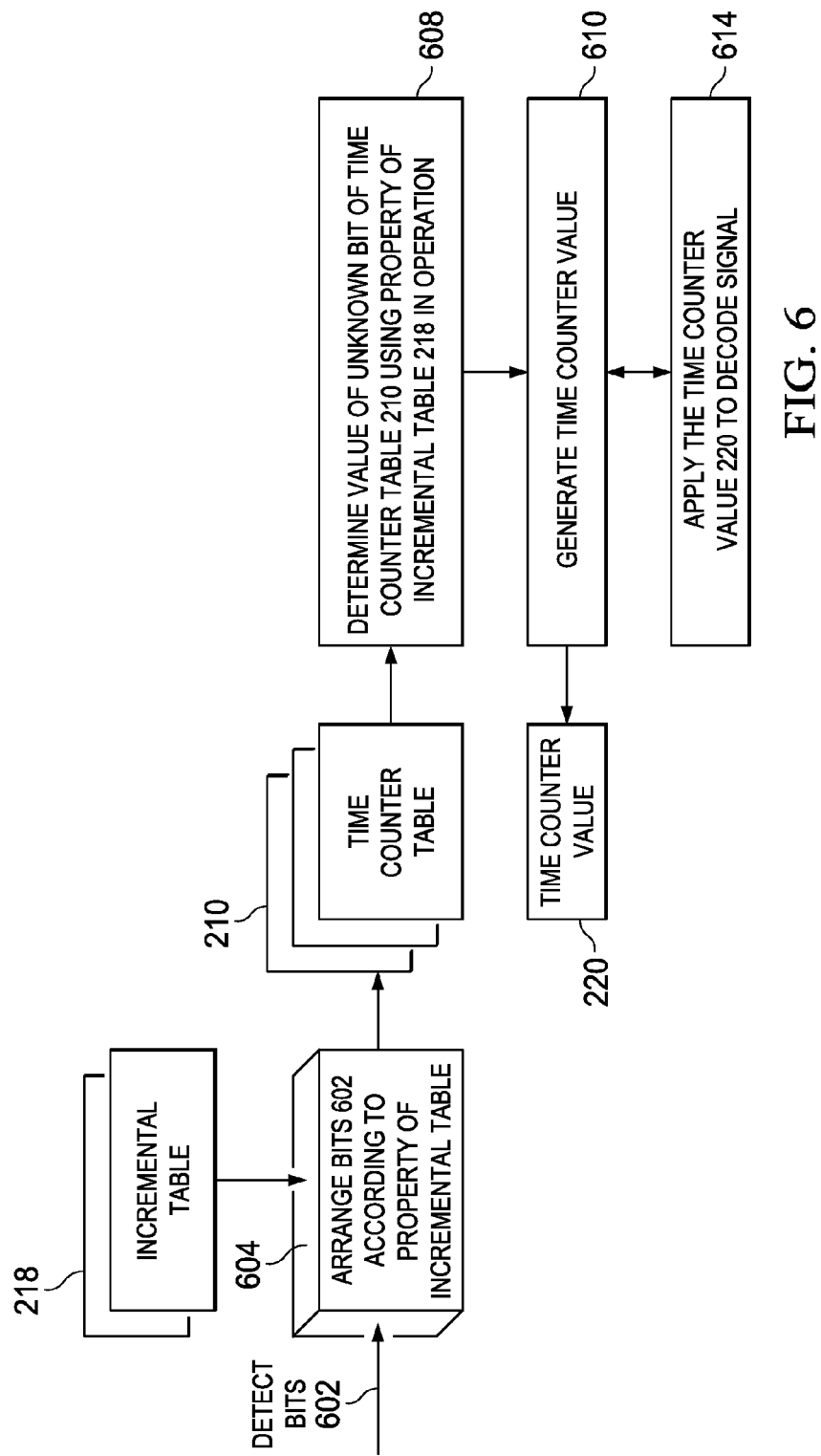
FIG. 6 is a flow diagram illustrating process of decoding a signal, according to one embodiment.

FIG. 6 is a flow diagram illustrating a process of decoding a signal (e.g., Global Positioning System (GPS) satellite signal), according to one embodiment. In operation 602, the bits may be detected (e.g., tracked). In operation 604, bits may be arranged according to property of incremental table (e.g., may be obtained from the incremental table 218). In operation 608, a value of unknown bit of time counter table 210 may be determined using property of incremental table 218. In operation 610, a time counter value 220 may be generated. In operation 614, the time counter value 220 may be applied to decode the signal (e.g., Global Positioning System (GPS) satellite signal).

FIG. 7 is a graphical view illustrating performance improvement over prior art, according to one embodiment. Particularly, FIG. 7 illustrates a performance improvement 700, a satellite power (dBm) 702, and a time to decode time counter values (Minutes) 704, according to one embodiment.

The performance improvement 700 illustrates the improvement in performance (in terms of satellite power (dBm) 702) compared to the prior art. The satellite power (dBm) 702 may be the measurement of power density of satellite signal in dBm. The time to decode the time counter (e.g. minutes) 704 may be the time required to decode the time counter data $102A_{0-N}$-$N_{0-N}$.

In example embodiment, FIG. 7 illustrates the performance improvement 700 in satellite power for the same amount of time required as in prior art.

Figure 8:
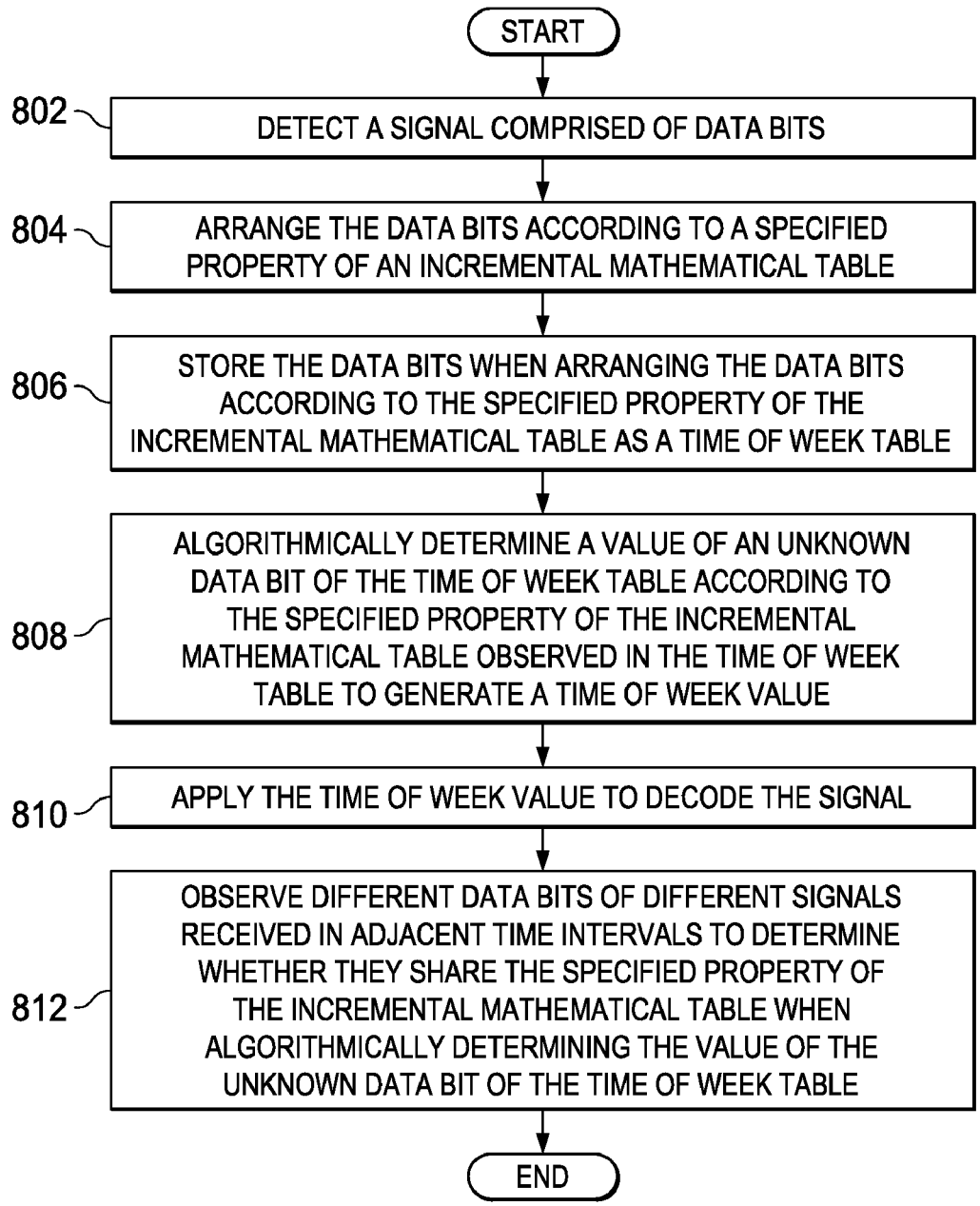
FIG. 8 is a process flow of detecting a signal comprised of data bits, according to one embodiment.

FIG. 8 is a process flow of detecting a signal (e.g., Global Positioning System (GPS) satellite signal) comprised of data bits (e.g., the global positioning signal composed of data bits), according to one embodiment. In operation 802, a signal comprised of data bits (e.g., may be global positioning signal composed of data bits) may be detected (e.g., using the time counter detector module 202 of FIG. 2A. In operation 804, the data bits may be arranged (e.g., using the table arrange module 212 of FIG. 2A according to a specified property of an incremental mathematical table (e.g., the incremental mathematical table 218 of FIG. 2A. In operation 806, the data bits may be stored (e.g., may be in time counter table 210 of FIG. 2A when arranging the data bits according to the specified property of the incremental mathematical table 218 as a time counter table (e.g., the time counter table 210 of FIG. 2A.

In operation 808, a value of an unknown data bit of the time counter table 210 may be algorithmically determined (e.g., using the comparison module 204 of FIG. 2A according to the specified property of the incremental mathematical table 218 observed in the time counter table 210 to generate a time counter value (e.g., the time counter value 220 of FIG. 2A, the time of the week value). In operation 810, the time counter value 220 may be applied (e.g., using the processor 222 of FIG. 2A to decode the signal. In operation 812, different data bits of different signals received in adjacent time intervals may be observed (e.g., using the multiple time interval module 208 of FIG. 2A to determine whether they share the specified property of the incremental mathematical table 218 when algorithmically determining the value of the unknown data bit of the time counter table 210.

Figure 9:
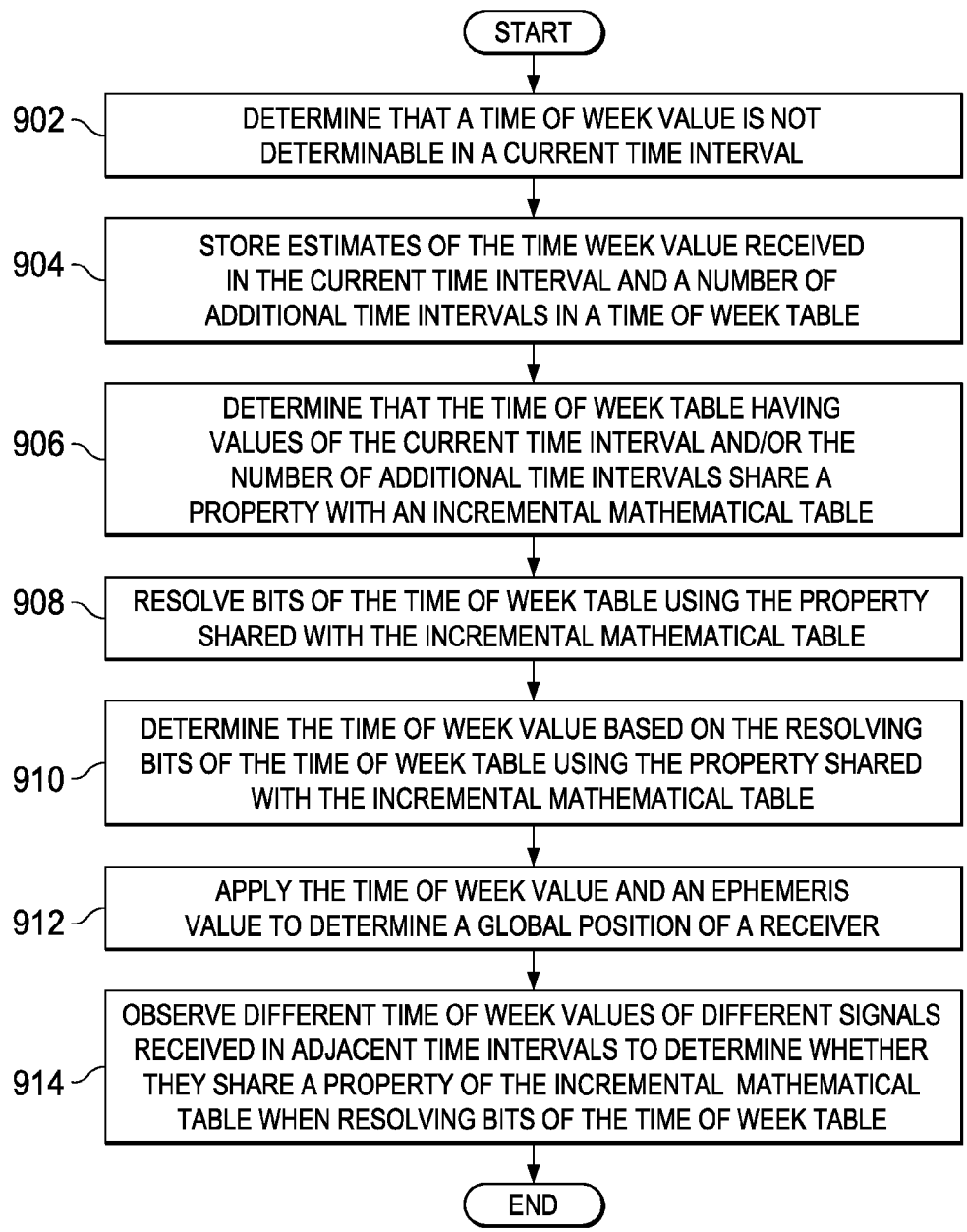
FIG. 9 is a process flow of observing different time counter values of different signals received in adjacent time intervals, according to one embodiment.

FIG. 9 is a process flow of observing different time counter values of different signals received in adjacent time intervals, according to one embodiment.

In operation 902, it may be determined that a time counter value (e.g., the time counter value 220 of FIG. 2A may not be determinable in a current time interval. In operation 904, estimates of the time counter value 220 received in the current time interval and/or a number of additional time intervals (e.g., using the multiple time interval module 208 of FIG. 2A may be stored in a time counter table (e.g., the time counter 210 of FIG. 2A. In operation 906, it may be determined that the time counter table 210 may have values of the current time interval and the number of additional time intervals may share a property with an incremental mathematical table (e.g., the incremental mathematical table 218 of FIG. 2A.

In operation 908, bits of the time counter table 210 may be resolved using the property shared with the incremental mathematical table 218. In operation 910, the time counter value 220 based on the resolving bits of the time counter table 210 may be determined using the property shared with the incremental mathematical table 218. In operation 912, the time counter value 220 and/or an ephemeris value may be applied to determine a global position of a receiver (e.g., the receiver 104 of FIG. 1). In operation 914, different time counter values of different signals received in adjacent time intervals may be observed to determine whether they share a property of the incremental mathematical table 218 when resolving bits of the time counter table 210.

Figure 10:
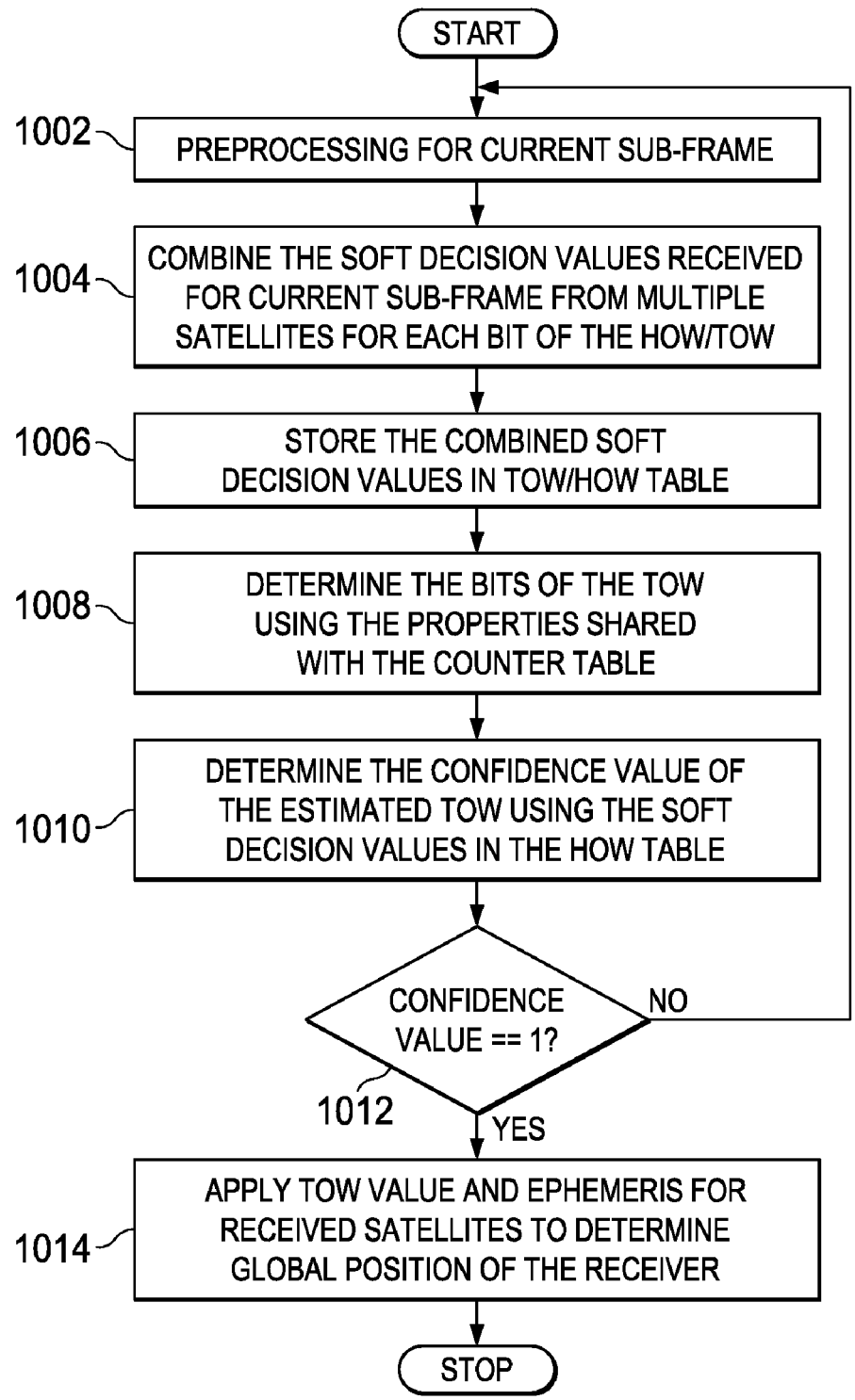
FIG. 10 is a flow chart illustrating processing for current sub-frame, according to one embodiment.

FIG. 10 is a flow chart illustrating processing for current sub-frame, according to one embodiment. In operation 1002, the current sub-frame may be preprocessed (e.g., using the processor 222 of FIGS. 2A, 2B and 2C). In operation 1004, the soft decision values received for current sub-frame from multiple satellites may be combined for each bit of the HOW/TOW. In operation 1006, the combined soft decision values may be stored in TOW/HOW table along with soft decision values from previous sub-frames. In operation 1008, the bits of the TOW may be determined using the properties shared with the counter table. In operation 1010, the confidence value of the estimated TOW may be determined using the soft decision values in the HOW table. In operation 1012, a condition may be determined to check whether the confidence value is equal to 1 (e.g., true or false), if the condition is false the operation 1002 is performed on the next sub-frame, if the condition is true, the operation 1014 is performed. In operation 1014, TOW value and ephemeris for received satellites may be applied to determine global position of the receiver 104.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

Particularly, the time counter detector module 202, the comparison module 204, the incremental property detector module 206, the multiple time interval module 208, the table arrange module 212, the switch module 214, and/or the period module 216 of FIG. 1-13 may be enabled using software and/or using transistors, logic gates, and electrical circuits (e.g., application specific integrated ASIC circuitry) such as a the time counter detector circuit, a comparison circuit, a incremental property detector circuit, a multiple time interval circuit, a table arrange circuit, a switch circuit, and a period circuit and other circuits.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method, comprising:
    detecting a signal comprised of a plurality of data bits;
    arranging the plurality of data bits according to a specified property of an incremental mathematical table;
    storing the plurality of data bits when arranging the plurality of data bits according to the specified property of the incremental mathematical table as a time counter table;
    algorithmically determining a value of an unknown data bit of the time counter table according to the specified property of the incremental mathematical table observed in the time counter table to generate a time counter value; and
    applying the time counter value to decode the signal.

2. The method of claim 1, further comprising observing different data bits of different signals received in adjacent time intervals to determine whether they share the specified property of the incremental mathematical table when algorithmically determining the value of the unknown data bit of the time counter table.

3. The method of claim 2, wherein the incremental mathematical table is an incremental bit-counter table.

4. The method of claim 1 wherein the time counter table begins at a zero value and incrementally increases by a value of one every six seconds for a duration of a calendar week and then resets to the zero value.

5. The method of claim 1, wherein algorithmically determining the value of the unknown data bit of the time counter table according to the specified property includes observing that a higher place data bit value of the time counter table switches from a state to another state when an adjacent lower place data bit value switches from an on-state to an off-state.

6. The method of claim 5, wherein algorithmically determining the value of the unknown data bit of the time counter table according to the specified property includes an observation that a period of alternation between bit states observed in a vertical arrangement of the time counter table increases by a factor of two at each higher bit place in each column of the time counter table.

7. The method of claim 1, wherein the signal is a Global Positioning System (GPS) satellite signal received from a satellite and wherein the time counter value is a time of week (TOW) value and the time counter table is a TOW table.

8. The method of claim 7, wherein other signals of at least four satellites are concurrently processed when decoding the signal.

9. A method of decoding a signal, comprising:
  determining that a time counter value is not determinable in a current time interval;
  storing estimates of the time counter value received in the current time interval and a number of additional time intervals in a time counter table;
  determining that the time counter table having values of the current time interval and the number of additional time intervals share a property with an incremental mathematical table;
  resolving bits of the time counter table using the property shared with the incremental mathematical table; and
  determining the time counter value based on the resolving bits of the time counter table using the property shared with the incremental mathematical table.

10. The method of claim 9, further comprising: applying the time counter value and an ephemeris value to determine a global position of a receiver.

11. The method of claim 9, further comprising: observing different time counter values of different signals received in adjacent time intervals to determine whether they share the property of the incremental mathematical table when resolving bits of the time counter table.

12. The method of claim 9, wherein the incremental mathematical table is an incremental bit-counter table.

13. The method of claim 9, wherein the time counter table begins at a zero value and incrementally increases by a value of one every six seconds for a duration of a calendar week and then resets to the zero value.

14. The method of claim 9:
  wherein resolving bits of the time counter table includes determining that bits of a higher place data bit value of the time counter table switch from a state to another state when an adjacent lower place data bit value switches from an on-state to an off-state; and
  wherein a differential demodulation is used by the receiver;
  wherein a plurality of resolving bits of a differential time counter table includes determining that bits of a higher place data bit value switches from one state to an other state 'T' time instants after an adjacent lower bit place value switches from an off state to an on state, where 'T' is quarter a period of column corresponding to a lower bit place.

15. The method of claim 14, wherein resolving bits of the time counter table includes an observation that a period of alternation between bit states observed in a vertical arrangement of the time counter table increases by a factor of two at each higher bit place in each column of the time counter table.

16. The method of claim 9, wherein the signal is a Global Positioning System (GPS) satellite signal received from a satellite and wherein the time counter value is a time of week (TOW) value and the time counter table is a TOW table.

17. The method of claim 16, wherein other signals of at least four satellites are concurrently processed when decoding the signal.

18. An integrated circuit, comprising:
  a time counter detector module to detect a signal comprised of a plurality of data bits;
  a table arrange module to arrange the plurality of data bits according to a specified property of an incremental mathematical table;
  a time counter table to store the plurality of data bits when arranging the plurality of data bits according to the specified property of the incremental mathematical table;
  a comparison module to algorithmically determine a value of an unknown data bit of the time counter table according to the specified property of the incremental mathematical table observed in the time counter table to generate a time counter value; and
  a processor to apply the time counter value to decode the signal.

19. The integrated circuit of claim 18, wherein the integrated circuit is an application specific integrated circuit designed for communication across different communication protocols including Bluetooth, Global Positioning System (GPS), and WiFi.

20. The integrated circuit of claim 18, further comprising a multiple time interval module to observe different data bits of different signals received in adjacent time intervals to determine whether they share the specified property of the incremental mathematical table when algorithmically determining the value of the unknown data bit of the time counter table.

* * * * *